United States Patent [19]

Farrell

[11] E Re. 28,721

[45] Reissued Feb. 24, 1976

[54] TIME SAVER PLASTIC DRAW-BACK VALVE ASSEMBLY

[75] Inventor: John J. Farrell, Green Brook, N.J.

[73] Assignee: Farrell Patent Company, Green Brook, N.J.

[22] Filed: Nov. 14, 1973

[21] Appl. No.: 415,639

Related U.S. Patent Documents

Reissue of:

[64] Patent No.: 3,709,644
Issued: Jan. 9, 1973
Appl. No.: 92,816
Filed: Nov. 25, 1970

[52] U.S. Cl. ..... 425/159; 425/167; 425/244; 425/245 R

[51] Int. Cl.[2] ..... B29F 1/04

[58] Field of Search ..... 425/145, 146, 159, 244, 425/245 R, 160

[56] References Cited

UNITED STATES PATENTS

| | | | |
|---|---|---|---|
| 2,202,140 | 5/1940 | Burroughs | 425/145 |
| 2,367,204 | 1/1945 | Cousino | 18/30 NW |
| 3,025,568 | 3/1962 | Hardy | 425/159 |
| 3,093,865 | 6/1963 | Peters et al. | 425/250 |
| 3,116,516 | 1/1964 | Moslo | 425/DIG. 211 |
| 3,127,637 | 4/1964 | Rex | 425/145 |
| 3,191,233 | 6/1965 | Linderoth, Jr. | 425/146 |
| 3,396,431 | 8/1968 | Kovach et al. | 425/159 |
| 3,526,929 | 9/1970 | Coupland | 425/245 X |
| 3,819,313 | 6/1974 | Josephsen et al. | 425/244 |
| 3,847,525 | 11/1974 | Bielfeldt et al. | 425/245 R |

FOREIGN PATENTS OR APPLICATIONS

| | | | |
|---|---|---|---|
| 35-8589 | 6/1961 | Japan | 18/30 AA |
| 1,293,637 | 4/1962 | France | 18/30 SQ |

*Primary Examiner*—Francis S. Husar
*Assistant Examiner*—David S. Safran
*Attorney, Agent, or Firm*—Marvin Feldman

[57] ABSTRACT

This invention decreases the time of an injection molding machine cycle by cutting off communication between the mold and the source of material as soon as injection is complete, and accumulating material for the next charge during the cooling part of the cycle. Pressure is maintained on the material in the mold, and material is supplied to compensate cooling shrinkage, from an auxiliary cylinder in which a minor amount of hot material is accumulated. After sufficient cooling, runner material is drawn back by suction of the auxiliary cylinder. A three-way valve cuts off the main material supply and puts the auxiliary cylinder in communication with the mold.

16 Claims, 3 Drawing Figures

INVENTOR
John J. Farrell
BY Dowson, Hopgood & Calimafde
ATTORNEYS.

TIME SAVER PLASTIC DRAW-BACK VALVE ASSEMBLY

Matter enclosed in heavy brackets [ ] appears in the original patent but forms no part of this reissue specification; matter printed in italics indicates the additions made by reissue.

BACKGROUND AND SUMMARY OF THE INVENTION

The present practice with injection molding machines is to use the helical screw in the plasticizer barrel as a ram to force material ahead of the screw into the mold. When the screw moves forward to its maximum injection position, it is necessary to maintain it in this position for a period of time which is called the "cure cycle." During the cure cycle, the screw maintains a pressure on the material to compensate for shrinkage of material which is cooling in the mold. Some additional material is forced into the mold to compensate this shrinkage.

The mold area is cooled so that the part being molded becomes solidified. After the cure cycle has been completed, the reciprocating screw plasticizer begins to rotate and forces plastic toward the discharge end of the barrel. The screw continues to rotate until a predetermined amount of material is accumulated at the front of the screw for the next injection operation. The amount of material accumulated is controlled by a limit switch which stops the screw and moves the non-rotating screw back so as to create a suction in the passages leading to the mold. This draws the hot runner material away from the mold and the mold is then opened and the molded part removed.

The objection to this method of operation of the prior art is that the molded part cannot be removed from the mold until the next injection shot has been plasticized and accumulated ahead of the plasticizer screw. The present invention reduces the auxiliary of operation of an injection molding machine by making it possible to remove the molded article much sooner. No drawback of the plasticizer screw is required and the preparation of the next injection charge can be prepared starting immediate after preparatory injection of the previous charge and without waiting for any part of the cure cycle to elapse.

This invention provides a valve between the mold and the discharge end of the plasticizer valve. An auxiliary cylinder and piston is used to maintain pressure on the material in the mold during the cure cycle and the piston in this auxiliary cylinder is reversed in direction to draw back the runner material prior to discharge of the molded part from the mold. Thus it is possible, with this invention, to open the mold, remove the molded part, and close the mold preparator to the next operation while the plasticizer screw is plasticizing the next quantity of material for the molding of another part. This greatly reduces the overall cycle of the apparatus.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF THE PREFERRED EMBODIMENT

Figure 1:
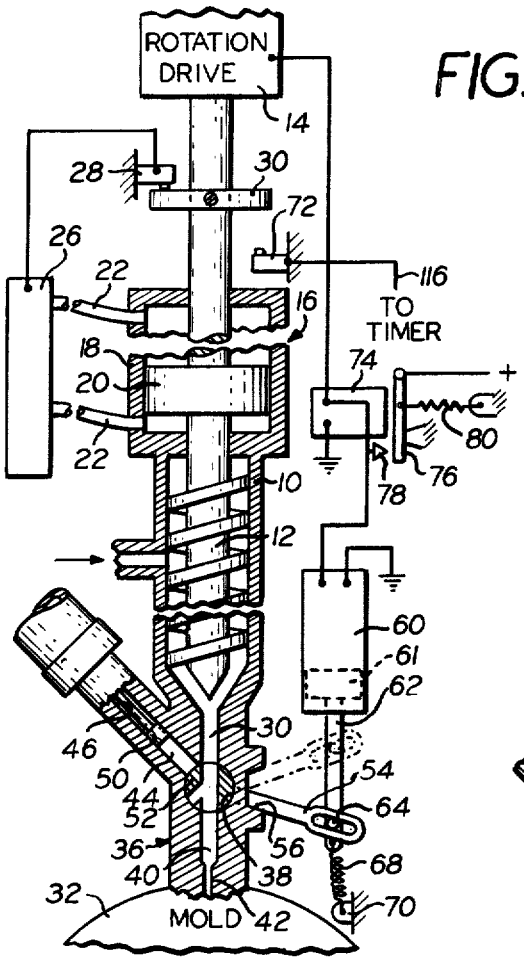
FIG. 1 is a diagrammatic view showing injection molding apparatus made in accordance with this invention.

The injection molding apparatus shown in FIG. 1 includes a plasticizer barrel 10 containing a helically threaded plasticizer screw 12 which is rotated in the barrel 10 by a rotation drive shown diagrammatically and indicated by the reference character 14.

The screw 12 is also movable longitudinally in the barrel 10 and this movement may be imparted to it by a cylinder-and-piston motor 16 comprising a cylinder 18 and a piston 20 rigidly secured to the screw 12 beyond the screw threads. The screw 12 has limited longitudinal movement, the amount depending upon the size of the charge to be injected into the mold. The rotation drive 14 is constructed to permit longitudinal movement of the screw 12 within the necessary limits.

Working fluid for operating the motor 16 is supplied through tubing 22 leading to opposite ends of the cylinder 18 and the working fluid is controlled by valve means in a valve controller 26.

The movement of the screw 12, in a direction to accumulate material ahead of it for the next injection operation, is limited by a switch 28 located at a fixed position in the path of an abutment 30 carried by the screw 12. This abutment 30 can be adjusted along the screw as so to strike the limit switch 28 after different amounts of movement of the screw 12 in an axial direction. The limit switch 28 controls the valve controller 26 to stop further operation of the motor 16 in its upward movement.

At the lower end of the plasticizer barrel 10 there is a passage 30 through which material is discharged from the valve 12 to other passages leading to a mold 32.

When the screw 12 is rotated and no material can discharge from the passage 30, the forcing of material against the lower end of the plasticizer barrel 10 causes the screw 12 to be forced back and this provides for movement of the screw 12 in an axial direction away from the passage 30 without using the motor 16. In some injection molding apparatus, this movement of the screw 12 away from the passage 30 compresses a spring; and when it becomes possible for material to flow from the barrel 10 through the passage 30 to a mold, the spring moves the screw 12 axially so that the motor 16 is not necessary. The motor 16 has the advantage, however, of controling the time that pressure is exerted to move the screw 12 toward the passage 30 for an injection operation and it also has the advantage of providing a uniform and controlled force which is not obtained when springs are used.

The apparatus thus far described is conventional and it is shown very diagrammatically because the way in which it is constructed is not at the point of novelty of the present invention and it is merely representative of conventional injection molding machine construction with which the novel elements of the present invention can be combined.

The passage 30 is located in a housing 36 containing a valve chamber 38 with which the passage 30 communicates. There is a second passage 40 in the housing 36 leading from the valve chamber 38 downward toward the mold 32. At the lower end of the second passage 40 there is a restricted passage 42 which may be considered as part of the runner of the mold 32.

In addition to the first passage 30 and the second passage 40, the housing has another passage 44 leading to a cylinder 46. In the construction illustrated, the cylinder 46 is of the same diameter as the passage 44 and is merely a continuation of the passage. A piston 50 reciprocates back and forth in the cylinder 46.

There is a valve element 52 in the valve chamber 38. The valve chamber 38 is of circular cross-section and the valve element 52 fits into the valve chamber with running clearance in accordance with conventional two-way valve construction. The valve element 38 has a stem extending through the end of the valve chamber 38 and has a handle 54 outside of the housing 36 and by which the valve element 52 can be moved into different positions.

Figure 3:
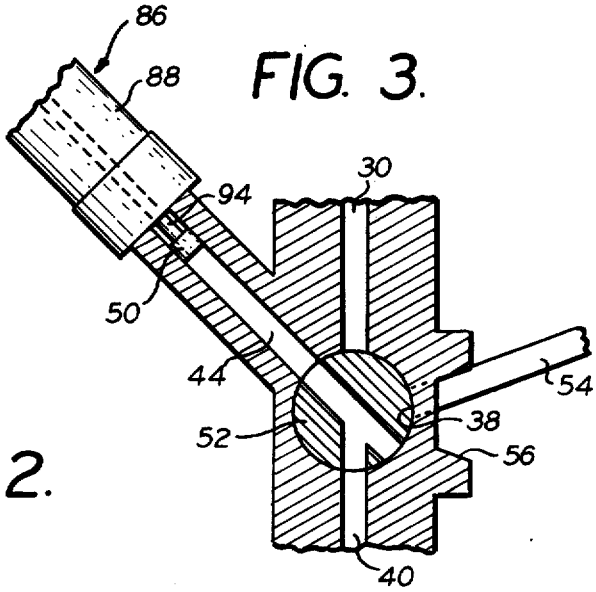
FIG. 3 is a fragmentary, sectional, diagrammatic view illustrating the drawback of runner material prior to the opening of the mold and the removal of a molded part.
Figure 2:
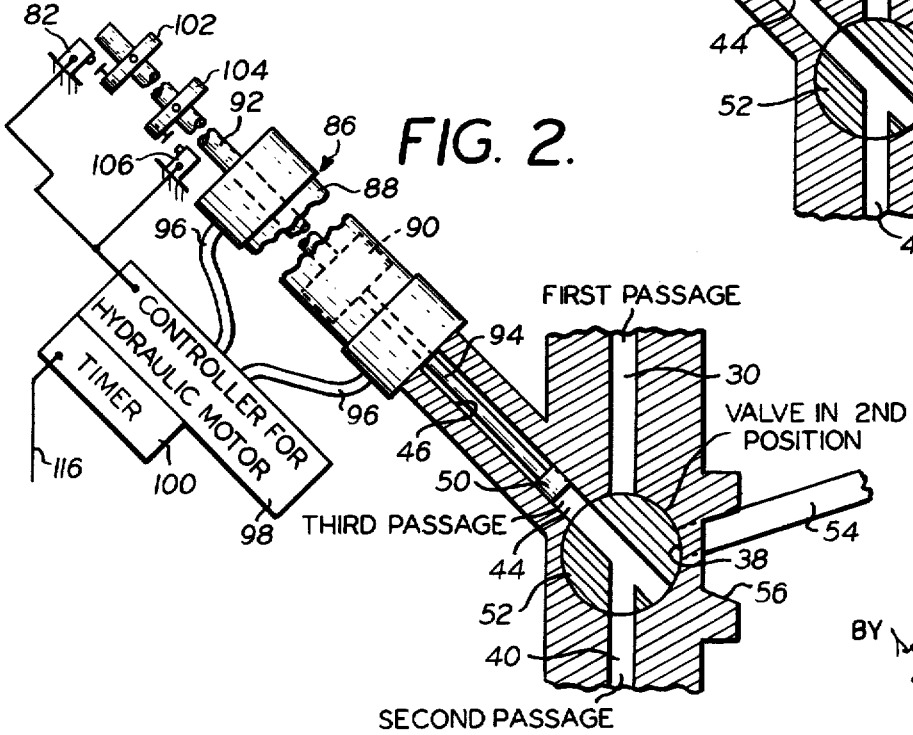
FIG. 2 is an enlarged, diagrammatic sectional view showing the piston in the auxiliary cylinder of FIG. 1 and showing also the actuator for the piston.

The position of the valve element 52 shown in FIG. 1 will be referred to herein as the first position. In this position, the valve element 52 puts the first passage 30 in communication with the second passage 40 and material from the plasticizer barrel 10 can flow directly from the barrel 10 to the mold 32. In FIGS. 2 and 3, the valve element 52 is shown in what will be referred to as its second position. In this position the second passage 40 is in communication with the third passage 44 and the first passage 30 is closed off.

When the handle 54 is in the full line position shown in FIG. 1, the valve element 52 is in its first position. When the handle 54 is raised into the dotted line position shown in FIG. 1, the valve element 52 is in its second position. The movement of the handle 54 is limited by stops 56 extending from the housing 36 into the path of movement of the handle 54. A valve operator 60 comprising a solenoid having a plunger 62 is supported in a fixed position with respect to the housing 36 and there is a pin 64 extending from the plunger 62 into a slot in the handle 54 for moving the handle angularly in response to up and down movement of the plunger 62.

The plunger 62 is moved upward by the solenoid 61 when the solenoid is energized; and the handle 54 is moved back into its full line position when the solenoid 61 is deenergized. A spring 68, tensioned between the handle 54 and a fixed spring anchor bracket 70, pulls the plunger 62 down.

Energy is supplied to the valve operator 60 from a limit switch 72 in the path of movement of the abutment 30. The abutment operates this limit switch 72 when the screw 12, operating as a ram, reaches the lower limit of its stroke.

The switch 72 is in a circuit with a relay 74 which is energized whenever the switch 72 is closed. This relay 74 is a stick relay and has an armature 76 which is pulled up against a contact 78, against the tension of a spring 80 whenever the relay 74 is energized. Closing of the relay 74 permits power to continue the energizing of the coil of relay 74 even after the abutment 30 has moved away from the limit switch 72 and the limit switch returns to a normally open position.

Referring to FIG. 2, there is an actuator 86 comprising a cylinder-and-piston motor, preferably a hydraulic motor. The actuator 86 has a cylinder 88 which contains a piston 90 having a piston rod 92, that extends through the upper end of the cylinder 88, and a smaller piston rod 94 which connects directly with the piston 50 in the pressure cylinder 46. Working fluid for the cylinder 88 is supplied to opposite ends of the cylinder through tubing 96 from a controller 98 containing conventional valve means. The controller 98 is connected with a timer 100 which controls part of the operation as will be explained hereinafter.

The upper piston rod 92 has abutment collars 102 and 104 located at spaced apart locations and these collars 102 and 104 are preferably adjustable into different positions axially along the piston rod 92. These limit switches are connected with the controller 98 and stop further movement of the actuator 86 whenever one of the abutment collars 92 or 94 engages its limit switch 82 or 106.

The controls for the injection molding part of the apparatus, such as those valves in the valve controller 26, are not illustrated because such controls are well known and are not at the point of novelty of this invention. No description of the valve structure in the valve controller 26 or in the controller 98 is necessary for a complete understanding of this invention.

The operation of the invention is as follows: The cycle begins with the valve element 52 in the position shown in FIG. 1. The screw 12 operating as a ram is pushed down by pressure supplied to the upper end of the cylinder 18 above the piston 20; and the hot material is forced through the first passage 30, through the valve element 52, second passage 40 and mold runner 42 into the mold 32. The screw 12 continues to move downwardly and fills the mold. The abutment 30 is adjusted so as to actuate the limit switch 72 when the mold is full and this actuation of the switch 72 moves the valve element 52 from its first position to its second position as shown in FIG. 2, as previously explained.

The passage 30 is now shut off and the cylinder 46 and third passage 44 are in communication with the second passage 40 and the mold through the valve element 52.

The actuation of the limit switch 72 (FIG. 1) also supplies energy through a conductor 116 to the timer 100 (FIG. 2), and this operation of the timer operates the controller 98 to supply working fluid to the end of the cylinder 88 above the piston 90 so that this piston 90 moves downward and moves the piston 52 downward. Since the third passage 44, the passages through the valve element 52, the second passage 40 and the mold are full of plasticized material, the only movement which the piston 50 can make as the result of the pressure against the system 90 is a very limited movement as the material in the mold cools and shrinks. Such shrinkage permits a limited amount of the hot material in the third passage 44 to be moved through the vale valve element 52 and second passage 40 to the mold and the piston 50 moves from the position shown in FIG. 1 to the position shown in FIG. 2. Thus pressure is maintained on the material in the mold and any additional material that is necessary to compensate shrinkage is supplied to the mold.

The tuner 100 is adjusted for the cooling cycle of the apparatus and when the timer 100 times out, it actuates the controller 98 to reverse the operation of the actuator 86. Working fluid is supplied to the lower end of the cylinder 88, under the piston 90, and the upper end of the cylinder 88 is opened for exhaust. This causes the piston 50 to move upward in the cylinder 46 so that it sucks the hot plastic material from the second passage 40 and from the mold runner. This severs the molten material in the runner from the molded part in the mold, and the mold can be opened to discharge the molded part.

As previously explained, the upward movement of the piston 50 is limited by the switch 82 and the actuator 86 holds the piston 50 in the position shown in FIG. 3 until the mold is again closed after having discharged the molded article.

When the mold is closed, a new cycle of operation is started by operating the controller 98 to again move the actuator 86 in a direction to shift the piston 50 from its FIG. 3 position to its FIG. 1 position. This discharges excess material from the cylinder 46 into the mold and the solenoid 61 is now deenergized permitting the valve element 52 to return to its first position, as shown in FIG. 1. At the same time that the valve 52 is shifted into its first position by breaking the holding circuit 76–78 of relay 74, the valve controller 26 is operated to operate the motor 16 to start the screw 12 moving downward as a ram to fill the mold as the start of another cycle.

The preferred embodiment of the invention has been illustrated and described, and changes and modifications can be made in different combinations without departing from the invention as defined in the claims.

What is claimed is:

1. An injection molding apparatus including a barrel for holding molten plastic material, a first passage connected at one end with the barrel for receiving hot plastic material from the barrel, a second passage connected with the other end of the first passage for receiving molten material from the first passage for supplying the material to a mold, a cylinder, a third passage connected at one end with the cylinder and connected at its other end with the second passage, a piston in the cylinder, movable in one direction to maintain pressure on any molten material in the cylinder, third passage and second passage, and movable in the other direction to exert a suction action in the cylinder, third passage and second passage for drawing molten material in the second passage back into the third passage and cylinder, and valve means, located between the first and second passages and between the second and third passages, movable into different positions including a first position that closes off the third passage from the second passage and that puts the first passage in communication with the second passage, and a second position that shuts off the first passage from the second passage and that puts the second passage in communication with the third passage, *said valve means preventing communication between said first and third passages in said two positions.*

2. The injection molding apparatus described in claim 1 characterized by the valve means including a housing, a valve chamber within the housing, all of the passages opening into the valve chamber, and the valve means including also an element in the chamber movable into said first and second positions.

3. The injection molding apparatus described in claim 2 characterized by the valve means being a single three-way valve, the valve chamber being of circular cross-section, and the valve element being a plug that fits into the valve chamber and that is rotatable about the longitudinal axis of the valve element, the passages opening into the valve chamber at angularly spaced locations around the circumference of the chamber, the valve element having passages therein that communicate with the various passages at different angular positions of the valve element, and an actuator for moving the valve element back and forth between said first and second positions.

4. The injection molding apparatus described in claim [1] *10* characterized by an actuator for the piston including a controller for supplying energy to the piston to urge the piston to move in one direction when the valve means is in [ said first] *the second* position to maintain pressure on any molten material in the [ third passage] *cylinder* and [ second passage ] *mold runner* during the cooling portion of a molding cycle [ and while the valve means is in position that puts the third passage in communication with the second passage ] whereby the piston forces additional material into the mold to compensate for shrinkage of the material in the mold while cooling, and automatic means associated with the controller for reversing the direction of the energy supply to the actuator, when the valve means is in said second position, to move the piston in a direction to draw back material from *the* runner [s], [ with which the molding apparatus is used ] after a predetermined cooling period.

5. The injection molding apparatus described in claim [4] *10* characterized by a valve operator for moving the valve means between its different positions including an automatic control that shifts the valve means from its first position at the end of an injection operation of said injection molding apparatus.

6. The injection molding apparatus described in claim [5] *10* characterized by a helically threaded plasticizer screw in the barrel, pressure means for advancing the screw longitudinally toward the first passage on an injection stroke while the valve means is in its first position, said valve means in its second position shutting off flow of material from the first passage, a motor for rotating the screw in a direction to urge material in the barrel toward the first passage after the valve means has moved into its second position whereby the continued rotation of the screw causes it to back away from said first passage, automatic means for stopping further rotation of the screw after it has backed away far enough to accumulate, between the screw and the first passage, enough material for the next mold charging operation.

7. The injection molding apparatus described in claim 6 characterized by the pressure means for advancing the helically threaded screw being a cylinder-and-piston motor that moves the helically threaded screw longitudinally when the motor for rotating the screw is not energized, and the automatic control for the valve operator being responsive to the movement of the screw toward the first passage.

8. The injection molding apparatus described in claim [1] *10* [ molten ] *characterized* by apparatus for injecting molten material at high temperature and pressure into the first passage and through the valve means to the second passage when the valve means is in its first position, the valve means shutting off all flow of material through the first passage when the valve means is in its second position, and a valve operator for moving the valve means from first position to second position and vice versa.

9. The injection molding apparatus described in claim 8 characterized by an automatic control responsive to the substantial completion of the filling of the mold for shifting of the valve means from first position to second position.

*10. An injection molding apparatus including a barrel for holding molten plastic material, a first passage connected at one end with the barrel for receiving hot plastic material from the barrel, a runner that supplies molten material to a mold cavity, a second passage connected with the other end of the first passage for receiving molten material from the first passage for supplying the material to the mold runner, a plasticizer including a helically threaded screw in the barrel, with a front end of the screw facing the first passage, pressure means for advancing the screw longitudinally toward the first passage to discharge material from the barrel on an injection stroke, a motor for rotating the screw in a direction to urge material in the barrel toward the first end of the screw during rotation of the screw as it backs away from said first passage, during its recovery stroke, automatic means for stopping further rotation of the screw after it has backed away far enough to accumulate, between the screw and the first passage, enough material for the next mold charging operation, means for regulating the plasticizer cycle to be less than that absent such means including a cylinder for communication at one end with the mold runner, a piston in the cylinder, movable in one direction providing means to maintain pressure on any molten material in the cylinder and in the mold runner during shrinkage of the molten material, the piston being movable in the other direction providing means to exert a suction action in the cylinder for drawing molten material in the runner back toward the cylinder, and valve means, located between the first and second passages and movable into different positions including a first position that puts the first passage in communication with the second passage, and a second position that shuts off the first passage from the second passage and provides communication between the cylinder and the second passage, said valve preventing communication between said cylinder and said first passage so that recovery of the plasticizer can begin before shrinkage of the plastic in the mold and before drawback of plastic from the runner.*

*11. The injection molding apparatus of claim 1, wherein said valve means prevents communication between said first and third passages in positions other than said two positions of said valve means.*

*12. The injection molding apparatus of claim 1, wherein the diameter of said cylinder is about equal to the diameter of said third passage.*

*13. The injection molding apparatus of claim 12, wherein said cylinder diameter is less than the diameter of said barrel.*

*14. The injection molding apparatus of claim 1, wherein said piston exerts sufficient suction so as to sever molten material in a runner from a molded part in the mold.*

*15. The injection molding apparatus of claim 10, wherein the diameter of said cylinder is about equal to the diameter of said second passage.*

*16. The injection molding apparatus of claim 15, wherein said cylinder diameter is less than the diameter of said barrel.*

* * * * *